No. 751,038. PATENTED FEB. 2, 1904.
T. R. WOLLASTON.
APPARATUS FOR REMOVING SUSPENDED MATTER FROM LIQUIDS BY CONTINUOUS DECANTATION.
APPLICATION FILED JAN. 28, 1903.
NO MODEL. 2 SHEETS—SHEET 2.

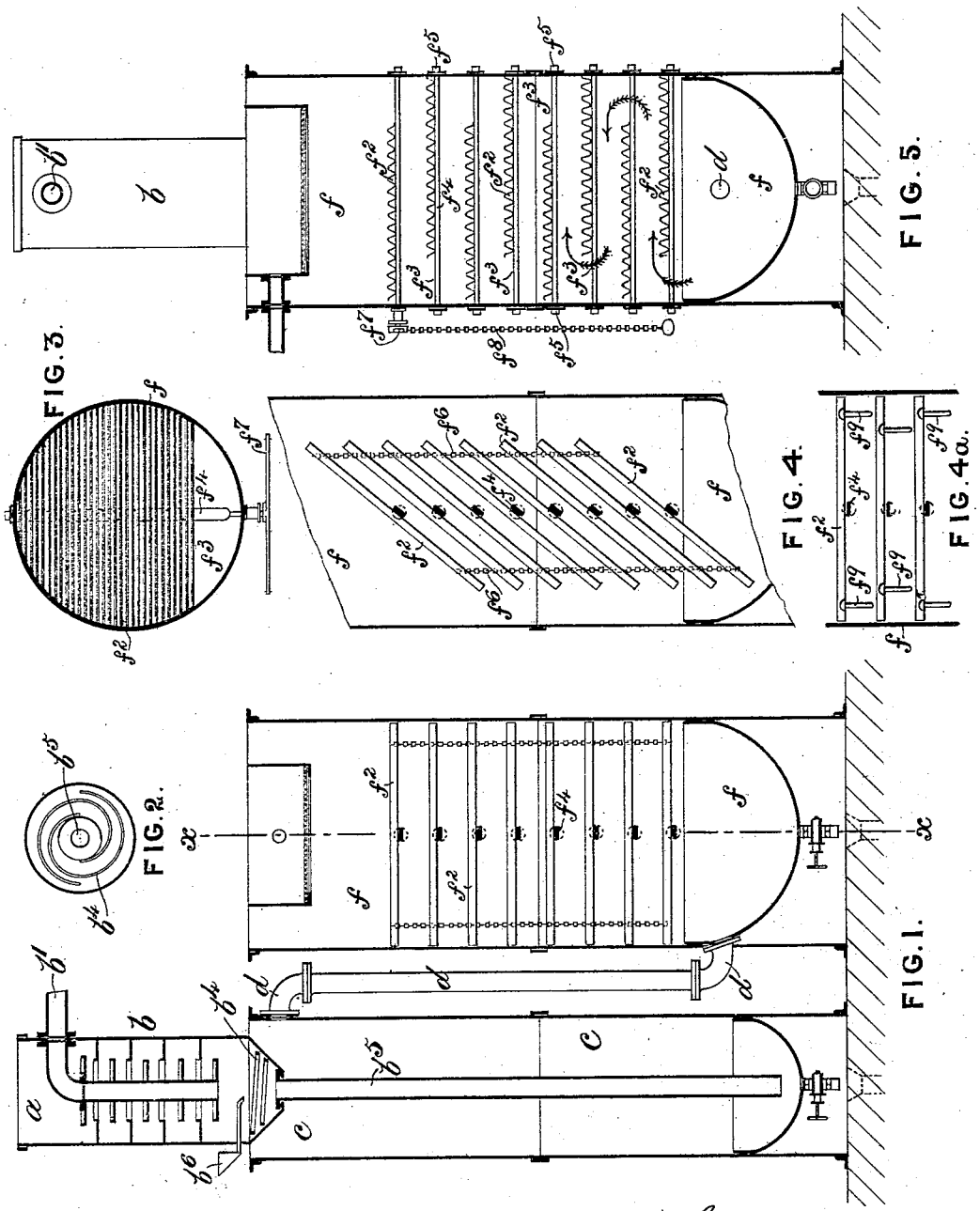

Witnesses
C. D. Dunn
E. J. Babcock

Inventor
Thomas Roland Wollaston
by Wm. H. Babcock,
Attorney

No. 751,038. Patented February 2, 1904.

UNITED STATES PATENT OFFICE.

THOMAS ROLAND WOLLASTON, OF MANCHESTER, ENGLAND.

APPARATUS FOR REMOVING SUSPENDED MATTER FROM LIQUIDS BY CONTINUOUS DECANTATION.

SPECIFICATION forming part of Letters Patent No. 751,038, dated February 2, 1904.

Application filed January 28, 1903. Serial No. 140,832. (No model.)

*To all whom it may concern:*

Be it known that I, THOMAS ROLAND WOLLASTON, a subject of the King of Great Britain and Ireland, and a resident of 29 Corporation street, Manchester, county of Lancaster, England, have invented certain new and useful Apparatus for Removing Suspended Matter from Liquids by Continuous Decantation, (for which I have filed application for British Patent No. 16,684, dated July 28, 1902;) and I do hereby declare the following to be a full, clear, and exact description of the invention, such as will enable others skilled in the art to which it appertains to make and use the same.

This invention relates to improvements in settling tanks or vessels used for the clarification of liquids containing suspended matter by continuous decantation of the clear liquid from its precipitated contents in the process of softening water or analogous operations.

Other things being equal, the rate of precipitation of the suspended matter depends on the vertical thickness of the layer of water through which any particle has to fall. If the depth of the precipitating vessel is divided by a number of diaphragms over which the liquid travels in a zigzag course, the clarification takes place more rapidly than if the precipitate has to descend through the whole depth of the column of liquid. Such diaphragms have been used in a permanently-inclined position, so that the precipitate may run down and off the slopes to the sides.

According to this invention the decanting or precipitating vessel is provided with horizontal depositing shelves or diaphragms arranged so that they may be tilted at intervals to allow the precipitate to run down.

In the accompanying drawings is illustrated the application of the invention to apparatus used for softening water.

Figure 7:
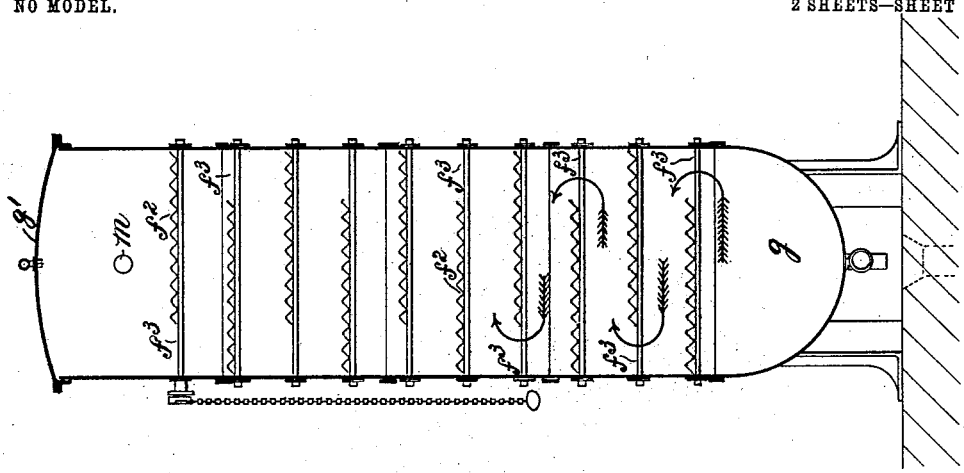
Figure 6:
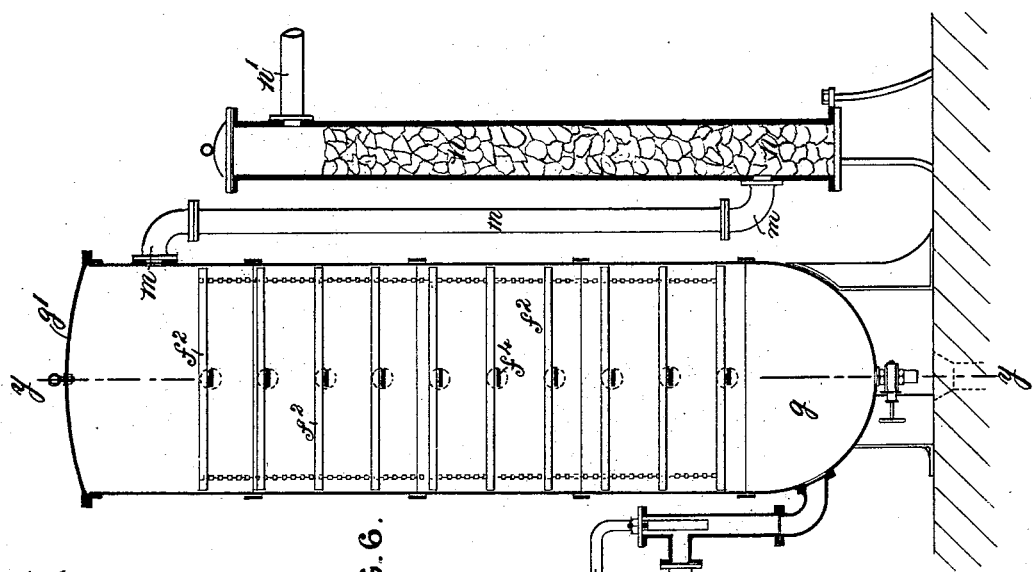

In the accompanying drawings, Figure 1 represents a vertical section of the apparatus embodying the invention. Fig. 2 represents a plan view of the lower part of the vessel $b$, containing helical blades $b^4$. Fig. 3 represents a plan view of the clarifying-receptacle $f$. Fig. 4 represents a vertical section of a part of the said receptacle, the shelves being shown in elevation and inclined. Fig. 4$^a$ represents a view similar to a part of Fig. 4, but with some alternative feature and the shelves horizontal. Fig. 5 represents a section on line $x\ x$ of Fig. 1. Figs. 6 and 7 represent vertical central sections of a modified form of the apparatus and are taken at right angles to each other.

In the apparatus shown in Figs. 1, 2, 3, 4, and 5 the water to be treated is admitted at $a$ to the heating part of the apparatus, consisting, preferably, of a vessel $b$ of cylindrical form, having a steam-pipe $b'$ in the center dipping downward to near the bottom of the vessel, where the steam admitted at $b'$ is discharged, so that in rising it meets the inflowing water. The latter falling as a series of cascades presents a considerable area to the action of the rising steam. A suitable reagent, such as a solution of soda, is admitted at $b^6$, and its mixing with the water is aided by the swirling action imparted by the helical webs or ribs $b^4$, lying in the lower part of the heating apparatus.

The water, either simply heated or treated with a reagent, descends the dip-pipe $b^5$ in the vertical precipitating vessel $c$ and rises to the upper part thereof, whence it flows along the pipe $d$ to the lower part of the second precipitating vessel $f$.

The dip-pipe $b^5$ preferably descends nearly to the bottom of the vessel $c$, so as to stir up the precipitate first deposited therein. It is found in practice that a precipitate so formed and dealt with sinks much more rapidly subsequently than if allowed to quickly descend in a single vessel.

In the interior of the vessel $f$ I arrange a number of precipitating shelves or diaphragms $f^2$. These shelves extend from one side to nearly the other side, where a space $f^3$ of sufficient area for the passage of the liquid is left. The spaces $f^3$ are arranged alternately right and left, so that the liquid is caused to flow from side to side, as indicated by the arrows in Fig. 5, as it ascends through the apparatus, depositing its suspended matter on the shelves.

The shelves are corrugated or so constructed as to provide a number of recesses running transversely to the direction of the flow of the liquid to receive and prevent the precipitate from being disturbed by the flowing liquid.

To enable the deposit to be removed, the shelves are mounted on bars $f^4$, journaled, as at $f^5$, in the sides of the vessel $f$, so that by lifting or depressing one end the shelves may be tilted, so as to cause the deposit to slide off and descend to the bottom of the vessel. The axes about which the shelves oscillate when being tilted run in the direction of the flow of the water, as shown in the drawings, so that when tilted the deposit is discharged longitudinally along the recesses of the corrugated shelves.

The shelves may all be tilted simultaneously. One way of accomplishing this is by connecting them with chains $f^6$, so that by tilting one of them all will move together. To one of the bars $f^4$ a lever $f^7$ is attached, carrying chains $f^8$ at each end. By pulling one or the other chain the shelves may be set either in a horizontal position for receiving the deposit or may be set in an inclined position to allow it to slide off.

In lieu of connecting the plates, struts or projections, such as $f^9$, Fig. 4ª, extending from one shelf to near the other may be used, so that when one shelf is tilted the others must follow. By constructing the decanting apparatus in this manner the shelves or diaphragms may be arranged very close to each other, so that for a given unit of cubical capacity the decantation can proceed with greater rapidity, and consequently a smaller vessel can treat a relatively greater quantity of liquid than is the case where inclined plates are used. This greater compactness of the apparatus, combined with the facility with which all the shelves may be tilted from the outside, is of special advantage in the case of vessels which are closed in such a manner that the decantation may take place under pressure owing to the lessened size, weight, and cost of the materials necessary for constructing apparatus sufficiently strong to withstand the pressure.

The application of the invention to the case of decanting under pressure is shown in Figs. 6 and 7. The decanting vessel $g$ is closed by a lid or cover $g'$. The liquid to be treated is forced in under pressure at $h$. The reagent is forced in at $k$. The tilting shelves $f^2$ are arranged and mounted and operated in the manner already described. The treated liquid passes down the pipe $m$ to a filtering-pipe $n$, where any matter still remaining in suspension is removed before the liquid leaves at $n'$. Stop-cocks or the like are provided for the exit of the deposit, as is usual in apparatus of this kind.

What I claim as my invention, and desire to secure by Letters Patent, is—

1. In combination with a precipitating vessel $f$, a series of pivoted depositing-shelves having corrugations or recesses running at right angles to the path of the liquid, the said shelves being arranged parallel with openings at opposite ends and mounted on pivots, the axes of which lie transversely to the corrugations substantially as and for the purpose set forth.

2. In combination with a precipitating vessel, a series of pivoted plates, corrugated transversely to the pivots thereof and arranged within said receptacle, means for connecting together the plates of each series on both sides of their pivots, an inlet at the bottom of said receptacle and an outlet at the top thereof, the said plates having openings at their ends arranged alternately substantially as set forth.

In witness whereof I have hereunto set my hand in the presence of two witnesses.

THOMAS ROLAND WOLLASTON.

Witnesses:
 JOHN HALL,
 G. W. TONSTALL.